(12) United States Patent
Oka

(10) Patent No.: US 9,118,783 B2
(45) Date of Patent: Aug. 25, 2015

(54) IMAGE FORMING APPARATUS, TEST SYSTEM, AND TEST METHOD FOR TESTING APPLICATION SCREEN

(71) Applicant: Kyocera Document Solutions Inc., Osaka (JP)

(72) Inventor: Yosuke Oka, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/470,290

(22) Filed: Aug. 27, 2014

(65) Prior Publication Data
US 2015/0062610 A1    Mar. 5, 2015

(30) Foreign Application Priority Data

Aug. 30, 2013 (JP) ................................. 2013-180039

(51) Int. Cl.
| | |
|---|---|
| *G06F 3/12* | (2006.01) |
| *H04N 1/00* | (2006.01) |
| *G06K 15/02* | (2006.01) |
| *G06F 3/00* | (2006.01) |
| *G06F 15/16* | (2006.01) |

(52) U.S. Cl.
CPC .......... *H04N 1/00042* (2013.01); *G06K 15/027* (2013.01); *H04N 1/0009* (2013.01); *H04N 1/00053* (2013.01); *H04N 1/00061* (2013.01); *H04N 1/00063* (2013.01); *H04N 1/00079* (2013.01)

(58) Field of Classification Search
None
See application file for complete search history.

(56) References Cited

U.S. PATENT DOCUMENTS

| | | | |
|---|---|---|---|
| 8,504,612 B2* | 8/2013 | Kawai et al. ................. 709/203 |
| 2010/0309502 A1* | 12/2010 | Ando et al. ................. 358/1.13 |
| 2011/0055323 A1* | 3/2011 | Kawai et al. ................. 709/203 |
| 2014/0267791 A1* | 9/2014 | Rainisto ..................... 348/207.1 |

FOREIGN PATENT DOCUMENTS

JP    2003-233513    8/2003

* cited by examiner

*Primary Examiner* — Ashish K Thomas
*Assistant Examiner* — Neil R McLean
(74) *Attorney, Agent, or Firm* — K&L Gates LLP

(57) ABSTRACT

The application processing unit executes an application on an application screen. The command analyzing unit analyzes a test command on the application screen received from an external apparatus, converts the test command into a plurality commands in a plurality of executable formats, and generates a command list from the commands. The command executing unit retrieves a command from the command list and executes the command on application screen processing data. The capture processing unit acquires a capture image of an application screen that is generated by executing the command if the application of the application screen is executed. The application screen test executing unit retrieves a next command from the command list, outputs the next command to the command executing unit, and stores the capture image until all the commands in the command list have been executed.

7 Claims, 3 Drawing Sheets

IMAGE FORMING APPARATUS, TEST SYSTEM, AND TEST METHOD FOR TESTING APPLICATION SCREEN

INCORPORATION BY REFERENCE

This application is based upon, and claims priority to corresponding Japanese Patent Application No. 2013-180039, filed in the Japan Patent Office on Aug. 30, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an image forming apparatus, a test system, and a test method for testing application screen.

BACKGROUND

An image forming apparatus, such as a printer or a multi-function peripheral (MFP), or the like is typically provided with an application environment of a web browser. A user generates a graphical user interface (GUI) on an application screen via hypertext markup language (HTML), and displays and operates the application screen using a web browser. To determine if the generated application screen operates normally, the user performs a test. For this test, the user causes an operation panel of an image forming apparatus to display the application screen, and performs an operation to verify whether the application screen operates properly by operating all operation items. While the verification operation is performed on the application screen, the user occupies the image forming apparatus. Due to this inconvenience, a method is known to test the application screen without the need to use any hardware device. For example, a virtual unit is available. In the virtual unit, an application program runs without using the hardware unit to cause a user to visually recognize the operation of the application program.

In the known method, the virtual unit as a software component needs to be generated to cause the application program of the hardware unit to be operative without using the hardware unit.

SUMMARY

The disclosure relates to an image forming apparatus that performs a test on an application screen thereof without implementing a new unit in the image forming apparatus and in a manner such that the image forming apparatus is not occupied by a user during the test. The disclosure also relates to a test system, and a test method.

In an embodiment, an image forming apparatus includes an application processing unit, a command analyzing unit, a command executing unit, a capture processing unit, and an application screen test executing unit.

The application processing unit executes an application on an application screen. The command analyzing unit analyzes a test command on the application screen received from an external apparatus, converts the test command into a plurality commands in a plurality of executable formats, and generates a command list from the commands. The command executing unit retrieves a command from the command list and executes the command on application screen processing data. The capture processing unit acquires a capture image of an application screen that is generated by executing the command if the application of the application screen is executed. The application screen test executing unit retrieves a next command from the command list, outputs the next command to the command executing unit, and stores the capture image until all the commands in the command list have been executed.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining in the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
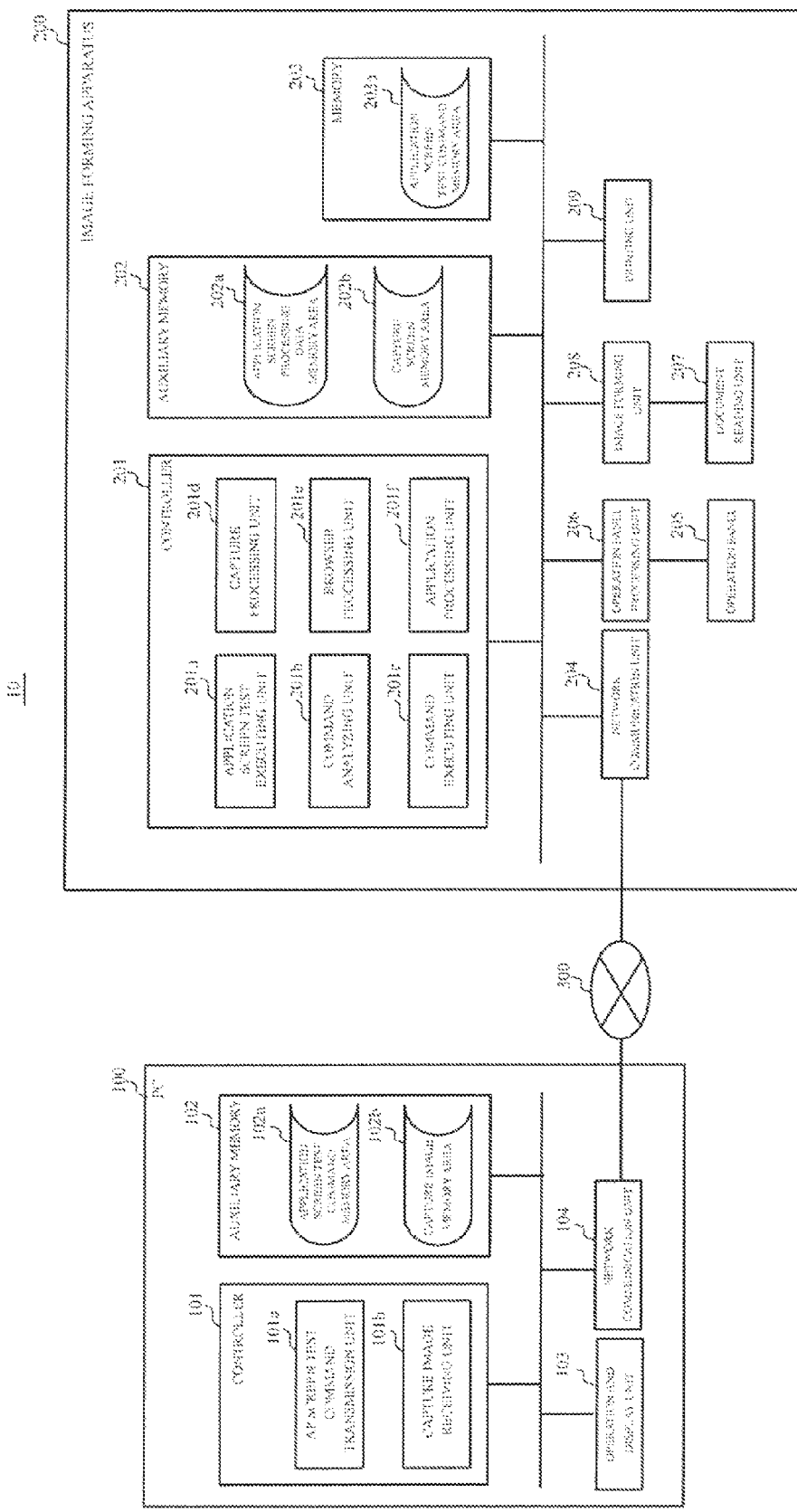
FIG. 1 is a schematic diagram illustrating a block configuration of a test system according to an embodiment of the present disclosure.

FIG. 1 is a schematic diagram of a block configuration of a test system 10 according to an embodiment of the present disclosure.

The test system 10 includes a personal computer (PC) 100 as a client device, and an image forming apparatus 200. The PC 100 is connected to the image forming apparatus 200 via a network 300. The PC 100 transmits a test command for an application screen to the image forming apparatus 200, and receives from the image forming apparatus 200 an image of an application screen ("capture image") as a result of the test command executed on the application screen. The image forming apparatus 200 may include a printer or a multi-function device. When receiving the test command of the application screen from the PC 100, the image forming apparatus 200 executes the test command on the application screen. The image forming apparatus 200 thus operates the application screen and acquires the capture image obtained in response to the operation of the application screen, and then transmits the capture image to the PC 100.

The PC 100 includes a controller 101, an auxiliary memory 102, an operation and display unit 103, and a network communication unit 104, with these elements interconnected via a bus.

The controller 101 includes a main memory device, such as a random-access memory (RAM) or a read-only memory (ROM), and a control device such as a central processing unit (CPU). The controller 101 generally controls the PC 100 including interfaces, such as a variety of inputs/outputs and universal serial buses (USBs), and a bus controller. The controller 101 includes an application (AP) screen test command transmission unit 101a to transmit an application screen test command to the image forming apparatus 200 and a capture image receiving unit 101b to receive a capture image from the image forming apparatus 200.

The auxiliary memory 102 is an auxiliary device including a flash memory. The auxiliary memory 102 stores a processing program to be executed by the controller 101 and data. The auxiliary memory 102 includes an application screen test command memory area 102a to store the application screen test command to be transmitted to the image forming apparatus 200, and a capture image memory area 102b to store a capture image received from the image forming apparatus 200.

The operation and display unit 103 includes an operation panel, receives an operation by a user, and displays operation results and a notification.

The network communication unit 104 includes a detachable local area network (LAN) interface to be connected to the network 300. The LAN interface includes a network section that performs intelligent transmission and reception in one of a variety of network protocols including: transmission control protocol/Internet protocol (TCP/IP); pleTalk; and SMB.

The image forming apparatus 200 includes a controller 201, an auxiliary memory 202, a memory 203, a network communication unit 204, an operation panel 205, an operation panel processing unit 206, a document reading unit 207, an image forming unit 208, and a printing unit 209. These elements are interconnected via a bus.

The controller 201 includes a control device, such as a micro processing unit (MPU) or a central processing unit (CPU), and generally controls the image forming apparatus 200 including interfaces, such as a variety of inputs/outputs and universal serial buses (USBs), and a bus controller. The controller 201 includes an application screen test executing unit 201a, a command analyzing unit 201b, a command executing unit 201c, a capture processing unit 201d, a browser processing unit 201e, and an application processing unit 201f.

When receiving an application screen test command from the PC 100, the application screen test executing unit 201a executes the application screen test command, and then transmits an acquired capture image to the PC 100. The command analyzing unit 201b analyzes the application screen test command output from the application screen test executing unit 201a, and generates a command list. The command executing unit 201c retrieves a command from the command list, and executes the command. The capture processing unit 201d executes the command to capture the image of the application screen generated in response to an operation on the application screen as a test target. The browser processing unit 201e executes GUI of the application screen generated via HTML. The application processing unit 201f executes an application on the application screen.

The auxiliary memory 202 includes a flash memory or the like, and stores a processing program executed by the controller 201 and data. The auxiliary memory 202 includes an application screen processing data memory area 202a that stores data including GUI of the application screen to be tested and applications. The application screen processing data is stored in advance by the user before an application screen test. The auxiliary memory 202 includes a capture screen memory area 202b that stores a capture image.

The memory 203 may be a hard disk drive that stores data and programs or a detachable USB memory that is connected to the image forming apparatus 200 via a cable. The memory 203 includes an application screen test command memory area 203a to store the application screen test command.

The network communication unit 204 includes a detachable LAN interface that is connected to the network 300. The LAN interface includes a network section that performs intelligent transmission and reception in one of a variety of network protocols including: transmission control protocol/Internet protocol (TCP/IP); pleTalk; and SMB.

The operation panel 205 displays an operation menu and receives an operation performed by a finger of the user. The user may enter a variety of information to be set in the image forming apparatus 200 using the operation panel 205.

The operation panel processing unit 206 performs an operation to display on the operation panel 205 operation items of functions of the image forming apparatus 200, and an operation to receive operation data responsive to an operation performed by the user on the operation panel 205.

The document reading unit 207 reads an original document set on a platen of the image forming apparatus 200. The user requests the document reading unit 207 to read the original document using the operation panel 205.

The image forming unit 208 converts the original document, read by the document reading unit 207 in response to the reading request from the user, into image data having an image printable on the printing unit 209 or transmittable via a facsimile machine or a mail.

The printing unit 209 prints the image data print-requested by the user onto a paper sheet or the like.

A procedure of the application screen test of an embodiment of the present disclosure is described with reference FIG. 2 and FIG. 3.

Figure 2:
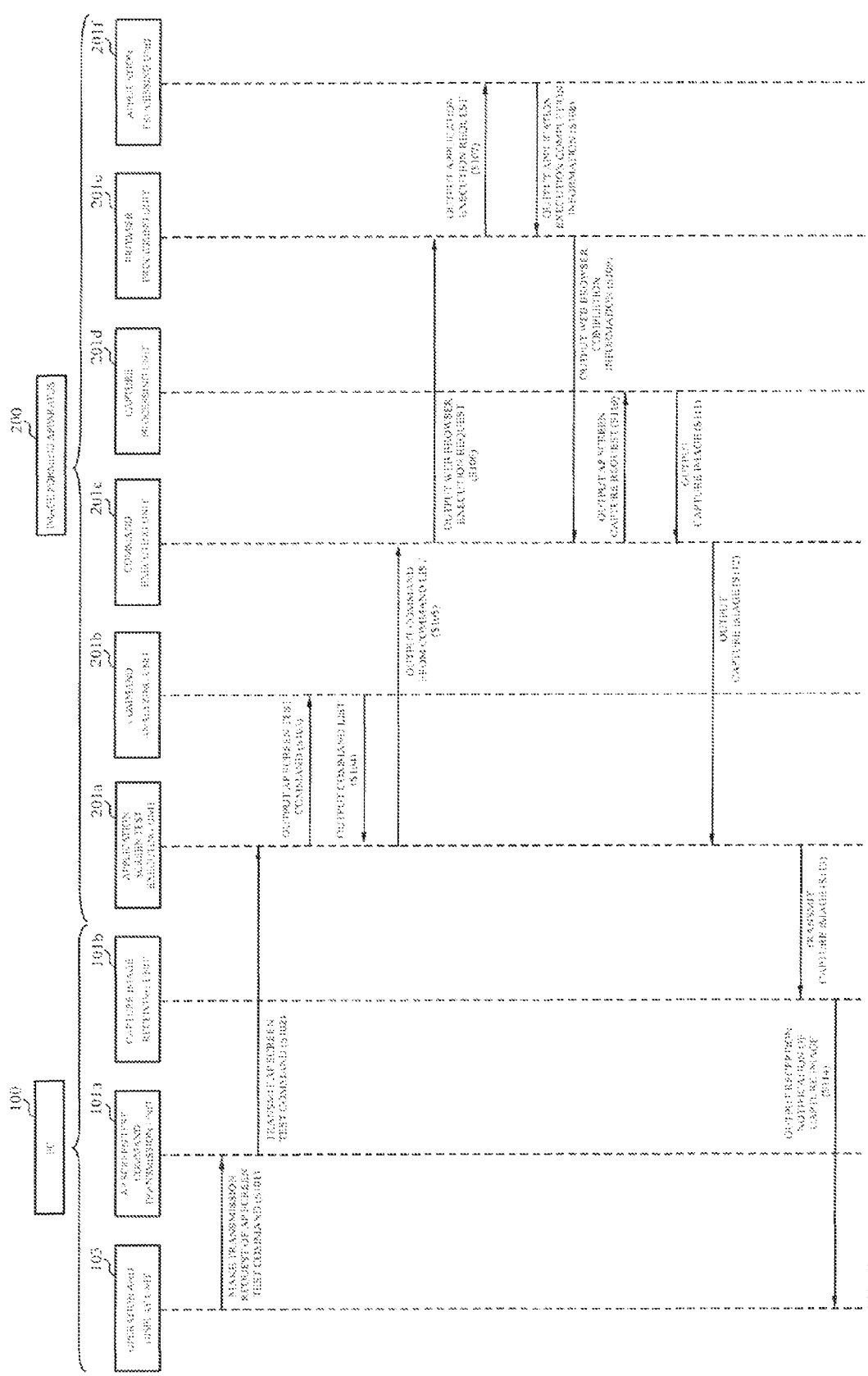
FIG. 2 is a sequence diagram of an application screen test performed by the test system.

FIG. 2 is a sequence diagram of an application screen test performed by the test system 10. FIG. 3 is a schematic diagram illustrating an example for displaying execution results of an application that is performed in response to an operation on the application screen in the test system 10.

Figure 3:
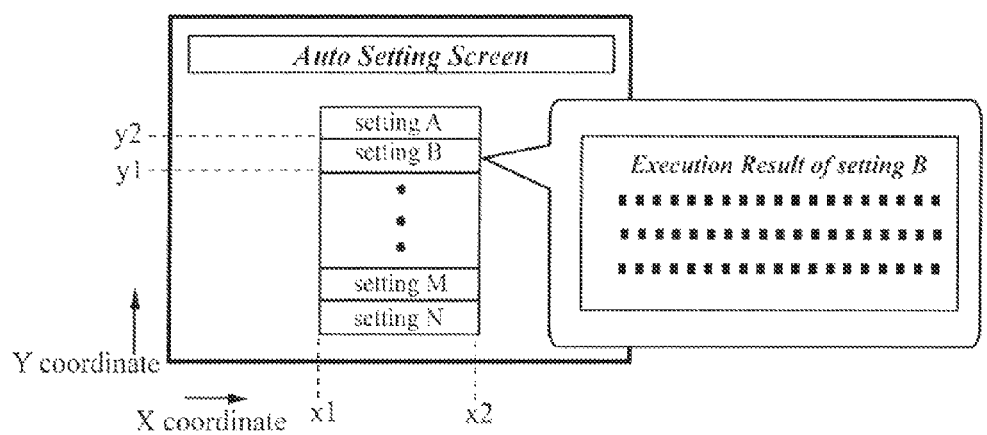
FIG. 3 is a schematic diagram illustrating an example for displaying execution results of an application in response to an operation on the application screen in the test system.

The user may now test an "auto setting screen" of FIG. 3 as the application screen. An application screen processing data, such as the GUI of the "auto setting screen," and the application is stored on the application screen processing data memory area 202a of the auxiliary memory 202 in the image forming apparatus 200. The user generates the application screen test command to instruct areas of "setting A", "setting B", . . . , "setting M", "setting N" on the "auto setting screen" to be pressed, and then stores the application screen test command on the application screen test command memory area 102a of the auxiliary memory 102 in the PC 100.

The application screen test procedure is described in the order of steps illustrated in FIG. 2.

In step S101, the user operates the operation and display unit 103 in the PC 100 to make a transmission request of the application screen test command. The operation and display unit 103 then outputs the transmission request of the application screen test command to the application screen test command transmission unit 101a.

In step S102, the application screen test command transmission unit 101a retrieves an application screen test command from the application screen test command memory area 102a in the auxiliary memory 102, and then transmits the application screen test command to the image forming apparatus 200 via the network communication unit 104.

In step S103, the application screen test executing unit 201a in the image forming apparatus 200 receives the application screen test command of the PC 100 transmitted from the application screen test command transmission unit 101a in the PC 100 and outputs the application screen test command to the command analyzing unit 201b.

In step S104, the command analyzing unit 201b receives and analyzes the application screen test command, and converts the application screen test command into commands, in a plurality of executable formats. The command analyzing unit 201b generates a command list from the commands. The command analyzing unit 201b outputs the generated command list to the application screen test executing unit 201a.

In step S105, the application screen test executing unit 201a receives the command list, selects from the command list a command to execute a series of operations, and outputs the command to the command executing unit 201c.

In step 106, when receiving the command, the command executing unit 201c retrieves the application screen processing data from the application screen processing data memory area 202a of the auxiliary memory 202, and executes the command on the application screen processing data. The command is considered to be data about the test procedure on an application screen process. By executing the command, an operation of the application screen processing data is performed on the application screen. When a web browser is executed in the execution of the command, the command executing unit 201c outputs a web browser execution request to the browser processing unit 201e. For example, if the command is a pressing instruction at X coordinates (x1,x2) and Y coordinates (y1,y2) of FIG. 3, an operation responsive to the pressing instruction of "setting B" at X coordinates (x1,x2) and Y coordinates (y1,y2) is performed.

When receiving the web browser execution request, the browser processing unit 201e executes a web browser in step S107. To execute an application, the web browser outputs an application execution request to the application processing unit 201f.

When receiving the application execution request, the application processing unit 201f executes the application in step S108. When completing the execution of the application, the application processing unit 201f outputs application execution completion information to the browser processing unit 201e.

In step S109, the browser processing unit 201e receives the application execution completion information and ends the execution of the web browser. The browser processing unit 201e outputs web browser execution completion information to the command executing unit 201c.

When receiving the web browser execution completion information, the command executing unit 201c outputs an application screen capture request to the capture processing unit 201d in step S110. There are times when the capture image is not completely generated even if execution of the web browser is completed. After a specified period of time (interval), the command executing unit 201c may output the application screen capture request again.

In step S111, the capture processing unit 201d acquires a capture image of the application screen responsive to the application screen capture request, and outputs the capture image to the command executing unit 201c. For example, if "execution result of setting B" is displayed in response to the pressing instruction of "setting B" in the "auto setting screen" of FIG. 3, the capture image of the "execution result of setting B" is acquired.

When receiving the capture image, the command executing unit 201c outputs the capture image to the application screen test executing unit 201a in step S112.

When receiving the capture image, the application screen test executing unit 201a stores the capture image on the capture screen memory area 202b in the auxiliary memory 202 in step S113. The application screen test executing unit 201a retrieves from the command list a command to execute a series of operations, outputs the command to the command executing unit 201c, and receives a capture image from the command executing unit 201c. The capture image is then stored on the capture screen memory area 202b of the auxiliary memory 202. Operations in steps from S105 to S112 are performed in this way, and the execution of all the commands in the command list is completed. The application screen test executing unit 201a retrieves the capture image from the capture screen memory area 202b of the auxiliary memory 202, and transmits the capture image to the PC 100 via the network communication unit 204.

In step S114, the capture image receiving unit 101b in the PC 100 receives the capture image transmitted from the application screen test executing unit 201a in the image forming apparatus 200, and then stores the capture image on the capture image memory area 102b of the auxiliary memory 102. The capture image receiving unit 101b outputs a reception notification of the capture image to the operation and display unit 103.

When receiving the reception notification of the capture image, the operation and display unit 103 displays the capture image on the operation panel in step S115 and the user recognizes the reception notification of the capture image. When the user performs an operation to operate the operation and display unit 103 to display the capture image, the operation and display unit 103 retrieves the capture image from the capture image memory area 102b and displays the capture image on the operation panel.

In the test system 10, the user generates the application screen of the image forming apparatus 200, and stores on the image forming apparatus 200 the application screen processing data, such as the GUI of the application screen or the application. The user then generates the application screen test command. The screen test command includes a command to execute a series of operations including an operation to test the application screen and an operation to acquire the capture image responsive to the operation to test the application screen. The user stores the application screen test command on the PC 100. When the user performs the transmission request of the application screen test command from the PC 100, the application screen test command is transmitted to the image forming apparatus 200. The image forming apparatus 200 executes the application screen test command. The image forming apparatus 200 transmits to the PC 100 the capture image acquired as a result of the execution of the application screen test command. The user may thus recognize the capture image on the PC 100. Rather than performing operations on the application screen to check the results of the operation one by one, the user generates the application screen test command of the application screen of the image forming apparatus 200 and causes the image forming apparatus 200 to execute the application screen test command. The user may thus check the test results of the application screen on the PC 100. The user performs the application screen test without occupying the operation panel 205 in the image forming apparatus 200 and without newly producing a virtual unit of the image forming apparatus 200.

In an embodiment, the generated application screen test command is stored on the PC 100. The application screen test command memory area 203a may be set up in the memory 203 to store the application screen test command, and the application screen test command may be stored on the application screen test command memory area 203a. The user may execute the application screen test command from the PC 100.

The application screen processing data of a plurality of application screens may be stored on the application screen processing data memory area 202a. The application screen test commands responsive to the application screen processing data of the plurality of application screens may be stored on the application screen test command memory area 102a. The user may thus test a plurality of application screens.

In an embodiment, the application screen test command is transmitted from the PC 100 to the image forming apparatus 200. The source of the application screen test command is not limited to the PC 100. The source may be a cellular phone, a mobile terminal, or other image forming apparatus connected to the PC 100 via the network 300. The application screen test command may be transmitted from one of these sources to the image forming apparatus 200 to verify the capture image.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus comprising:
a browser processing unit that outputs an execution request of an application to an application processing unit, the application processing unit executing the application on an application screen;
a command analyzing unit that analyzes a test command on the application screen received from an external apparatus, converts the test command into a plurality commands in a plurality of executable formats, and generates a command list from the commands;
a command executing unit that retrieves a command from the command list and executes the command on application screen processing data;
a capture processing unit that acquires a capture image that is an image of the application screen being generated by executing the test command if the application of the application screen is executed, the capture image being a result of the test command executed on the application screen; and
an application screen test executing unit that retrieves a next command from the command list, outputs the next command to the command executing unit, and stores the capture image until all the commands in the command list have been executed,
wherein the browser processing unit outputs execution completion information of a web browser to the command executing unit if execution completion information of the application is inputted by the application processing unit and the execution of the web browser is completed, and
wherein the command executing unit, if the execution completion information of the web browser is inputted, outputs a capture request of the application screen to the capture processing unit and outputs the capture image to the application screen test executing unit.

2. The image forming apparatus according to claim 1, wherein the command executing unit outputs the capture request again after a specified period of time has elapsed.

3. A test system of an application screen comprising a terminal apparatus and an image forming apparatus, each apparatus connected to a network,
the terminal apparatus including:
an application screen test command transmission unit that transmits a test command of the application screen to the image forming apparatus; and
a capture image receiving unit that receives a capture image that is an image of the application screen being generated by executing the test command if an application of the application screen is executed, the capture image being a result of the test command executed on the application screen, and
the image forming apparatus including:
a browser processing unit that outputs an execution request of the application to an application processing unit, the application processing unit executing the application on the application screen;
a command analyzing unit that analyzes the received test command, converts the test command into a plurality commands in a plurality of executable formats, and generates a command list from the commands;
a command executing unit that retrieves a command from the command list and executes the command on application screen processing data;
a capture processing unit that acquires the capture image; and
an application screen test executing unit that retrieves a next command from the command list, outputs the next command to the command executing unit, and stores the capture image until all the commands in the command list have been executed,
wherein the browser processing unit outputs execution completion information of a web browser to the command executing unit if execution completion information of the application is inputted by the application processing unit and the execution of the web browser is completed, and
wherein the command executing unit, if the execution completion information of the web browser is inputted, outputs a capture request of the application screen to the capture processing unit and outputs the capture image to the application screen test executing unit.

4. The test system according to claim 3, wherein the command executing unit outputs the capture request again after a specified period of time has elapsed.

5. The test system according to claim 3,
wherein the terminal apparatus includes an operation and display unit that displays the capture image,
the capture image receiving unit receives the capture image transmitted by the application screen test executing unit via the network, and
the operation and display unit displays the capture image by an operation of a user.

6. A test method of an application screen, comprising:
via a terminal apparatus connected with an image forming apparatus via a network,
transmitting a test command of the application screen to an image forming apparatus; and
receiving a capture image that is an image of the application screen being generated by executing the test command if an application of the application screen is executed, the capture image being a result of the test command executed on the application screen;

via the image forming apparatus,
outputting an execution request of the application;
executing the application of the application screen;
analyzing the test command of the application screen received from the terminal apparatus;
converting a plurality of commands in a plurality of executable formats;
generating a command list of the commands;
retrieving a command from the command list;
executing the command on an application screen processing data until all the commands in the command list have been executed;
acquiring a capture image of an application screen generated by execution of the command if the application of the application screen is executed;
retrieving a next command from the command list;
outputting the next command;
outputting execution completion information, if execution completion information of the application is inputted and the execution of a web browser of the image forming apparatus is completed;
outputting a capture request of the application screen, if the execution completion information of the web browser is inputted; and
storing the capture image until all the commands in the command list are executed.

7. The test method according to claim 6, comprising:
via the terminal apparatus,
receiving the capture image from the image forming apparatus via the network; and
displaying the capture image.

* * * * *